United States Patent Office 3,073,746
Patented Jan. 15, 1963

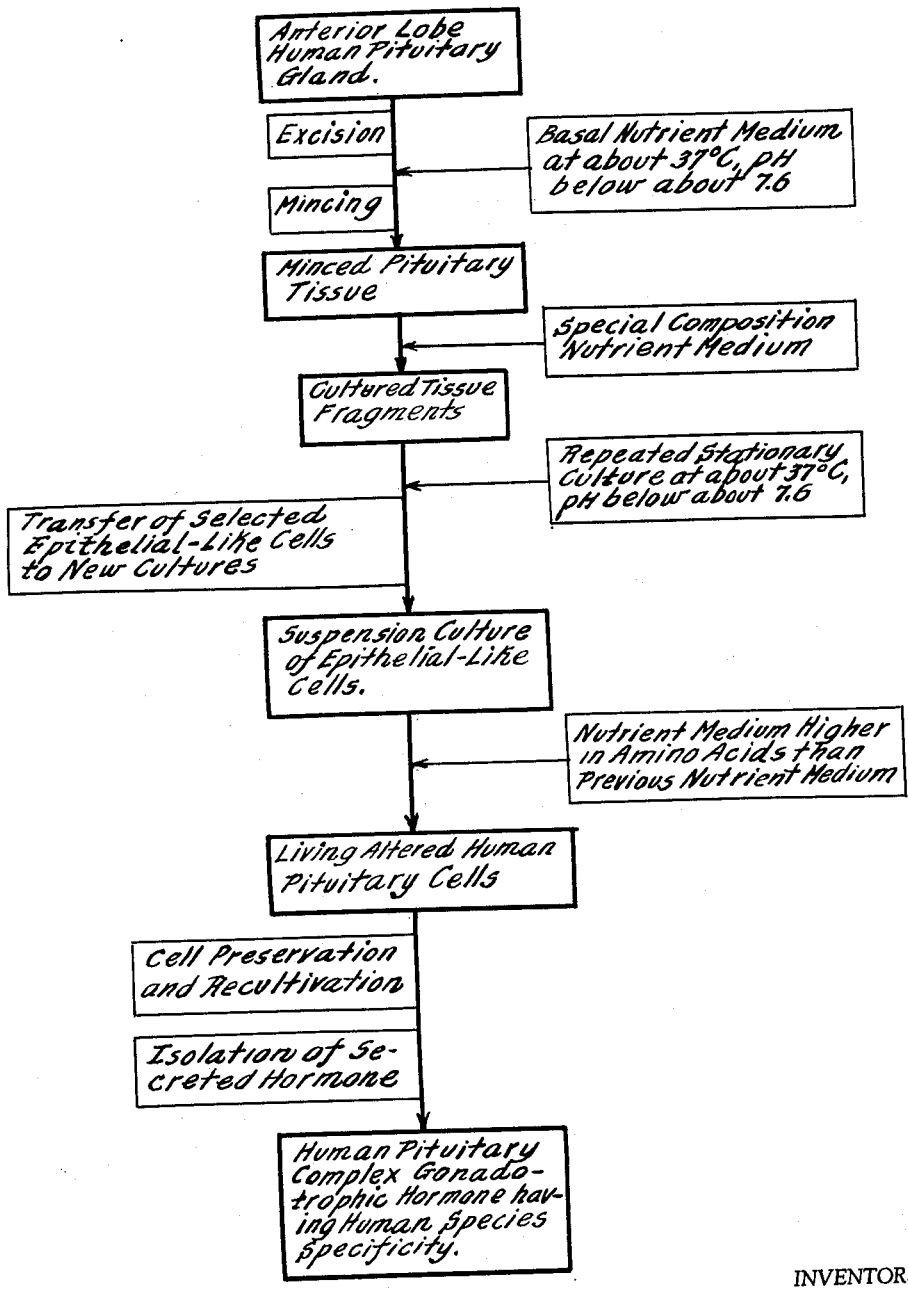

3,073,746
PROCESS FOR CULTURING ALTERED HUMAN SECRETORY PITUITARY CELLS
Kenneth Wade Thompson, Montclair, Eugene Schapiro, Nutley, and Richard Thompson Price, Verona, N.J., and Monroe M. Vincent and Fred C. Jensen, Chevy Chase, Md., assignors to Organon, Inc., Orange, N.J., a corporation of New Jersey
Filed May 21, 1959, Ser. No. 814,682
5 Claims. (Cl. 167—74)

This invention relates to a novel process for the production of physiologically active substances known to occur in the living body, in accordance with which human or animal cells are grown outside the body under conditions which maintain the ability of such cells to secrete such physiologically active substances. More particularly, the invention concerns a process for the production of pituitary hormones outside the human body by culturing selected cell lines derived from pituitary cells. In addition the invention includes altered living human pituitary cells and a novel process for culturing human pituitary cells to transform such cells into altered cells exhibiting changed morphological and metabolic characteristics.

Both human and animal pituitary glands are known to secrete various hormonal substances, including growth-, adrenocorticotropic, gonadotropic and other tropic or metabolism-regulating hormones. There are commercially available for therapeutic purposes, extracts of such hormones derived from the pituitary glands of hogs, sheep, and cattle. The anterior lobe of the animal pituitary gland is a commercial source of adrenocorticotropin (ACTH), and the product, which has an approximate molecular weight of about 4,500, is extracted from the whole animal pituitary gland. Other anterior lobe hormones include prolactin or luteotropin, and thyrotropin. Although the recovery of these hormones from animal pituitaries and other natural sources involves laborious and expensive processing, it has been necessary to rely solely upon restricted natural sources. At the same time, increasing recognition has come about of the differences in physical properties and molecular structure between pituitary hormones derived from natural animal sources and those secreted by human pituitaries. Thus, for example, it is known that human growth hormone has an average molecular weight which is about one-half that of animal growth hormones.

Moreover, while up to now it has been necessary to make use of starting materials of animal origin in order to obtain such products as pituitary gland hormones, hormones secreted by other glands, intrinsic factor, and the like, these products have exhibited the drawback of not having human species specificity and of possessing antigenity. Thus, growth hormone of animal origin shows no activity or only slight activity in the human body. Gonadotropin of animal origin gives rise to the formation of antibodies in the human organism. This is also the case with intrinsic factor preparations.

Pituitary hormones of human origin, such as ACTH, gonadotropin, and growth hormone, possess human species specificity and no antigenity when used for human therapy.

It is an object of the present invention to provide a process whereby physiologically active substances known to occur in the human body and having human species specificity and no antigenity can be produced outside the human body by culturing of human cells having secretory action therefor and isolation of the said substances from such cultures.

It is a further object of the invention to provide a process for the production of hormones having human species specificity by the isolation of such hormones from cultures of human cells having secretory action therefor.

It is another object of the invention to produce pituitary hormones having human species specificity with a high degree of uniformity, potency and purity by employing improved techniques of tissue culture and cell culture, to provide a means by which selected cell portions of human pituitary glands may be maintained in continued cell growth outside the body, and to isolate such human pituitary hormones from the cultured cells which secrete them.

It is a still further object of the present invention to provide a process for the production of gonadotropin having human species specificity by isolating the gonadotropin from cultured human pituitary cells having secretory action therefor.

It is an additional object of this invention to provide methods of propagating and transferring cultures incorporating a system which does not require use of an enzyme or the mechanical scraping of cell sheets, by utilizing fragments of coverslips within a culture as seeding or starters for new cultures, and transferring these fragments to new culture flasks.

These and other objects will appear as the description proceeds.

It will be understood, however, that the methods disclosed may be similarly employed in the growth of secretory cells of animal origin, such as animal pituitary gland cells.

The prior art contains the suggestion that cultures of pituitary tissue or of individual cells of pituitary glands can be prepared, but the methods described have not been applied to human pituitary cells, nor have there been any indications in the prior art that hormones or any other useful products were produced in cell culture by the methods therein described. Thus, U.S. Patent 2,658,021 of W. R. Earle suggests a special technique of tissue culture employing a nutrient medium conditioned by previous tissue cell growth therein and proliferating the tissue cells to obtain massive tissue cultures of like cells undifferentiated between each other and all descended unaltered from the original tissue cells. The patent describes the technique, as applied to the connective tissue of a mouse, whereby cell proliferation is initiated in a restricted body of nutrient and migration of cells therefrom into a larger body of nutrient follows during growth.

Explants of pituitary tissue were reported to produce detectable amounts of pituitary hormones, when fragments of dog and rat pituitaries were grown in tissue culture, by Guillemin and Rosenberg (Endocrinology, vol. 57, pages 599–607, November 1955), who indicated they found ACTH in the fluids bathing these tissues only during the first four days of the culture period.

The process of this invention, including the culture of human cells outside the body to secrete physiologically active substances having human species specificity and the isolation of such substances from these cultures, will be illustrated with reference to human pituitary cell culture and hormone isolation. The process of this invention may, however, be employed for the production and isolation of other physiologically active products of human origin, including not only hormones of the pituitary gland in general, but of hormones secreted by other glands or organs, and of such products as intrinsic factor, and numerous others.

The invention concerns the serial cultivation of cells derived from the human anterior pituitary gland and the isolation of hormones produced in the course of such cultivation.

It has been found, in accordance with this invention, that in the course of a number of passages or transfers in selected cell culture media, specific cell lines are established in which the propagation or proliferation of selected cells progressively leads to fundamental changes in the nuclear structure of the cell, manifested, for example, by a chromosome count which is higher than the chromosome count found in the same type of cell occurring in normal living human pituitary tissue. In this altered condition, the original cells have in effect given rise to altered types of cells not found in the human organism. These altered cells, evolved from their ancestral human pituitary cells in accordance with the process of this invention, exhibit the ability to secrete pituitary hormones. Single hormones can accordingly be produced by such cells outside the human body, in contrast to the production of mixed hormones in the pituitary gland itself. In consequence there is provided by the present invention a novel process by which large scale industrial culture of the altered cells can be employed to obtain quantities of given human or animal anterior lobe pituitary hormones, including growth-, adrenocorticotropic, gonadotropic (both follicle stimulating and luteotropic), and thyrotropic hormones. By the application of similar principles, the process of this invention can be adapted to the production of physiologically active substances in general by cell growth outside the human or animal body. It will be understood, however, that this invention is not limited to the use of altered cells as a means of hormone production, but that unaltered cells may be grown by similar culture methods in large scale industrial methods for the purpose of hormone production.

Altered cells produced in accordance with this invention are considered to result from the use of selected and controlled conditions in cell culture whereby cell growth is promoted and sustained in the absence of the restraining influences present in the body. The artificially growing cells are in a state of active metabolism and accelerated changes in chromosome count and in chromatin granule characteristics have taken place in the early stages of their culture, after which a state of permanence of the alterations of the cell is achieved.

The culture method of this invention is based upon the principle of serial cell culture and includes (a) initial growth of undifferentiated or heterogeneous cells; (b) development from the undifferentiated cell stage in stationary cultures while allowing sufficient time for the desired cells to gain a foothold so that they may be selected, and while avoiding mechanical injury to the fragile cells; (c) selection of desired cells from the heterogeneous group to become the basis of a selected, highly homogeneous cell line, which is introduced for continuous propagation into suspension culture or other suitable type of culture; (d) use of culture media including extra amino acids; (e) hormone production and isolation in selected cell line culture.

The culture method of this invention thus comprises essentially the following steps, to be described in detail below and illustrated by the accompanying drawing:

(1) Harvesting of starter culture of tissue, transportation and processing for propagation; (2) stationary tissue culture stage; (3) suspension cell culture stage; (4) cell line and harvesting and preservation of cell suspensions. The process of this invention by which human cells are grown outside the body under conditions which maintain the secretory ability of the cells, for the production of physiologically active substances, such as hormones, will be illustrated with respect to the culture and preparation of hormones from human pituitary cells, but it is to be understood that the procedures disclosed are broadly applicable to the culturing and production of hormones from similar animal pituitary cells, to the production of individual hormones, and to the growth of other types of cells. The following examples illustrate the application of the process to the growth of a human pituitary cell line capable of producing gonadotropin, and the isolation of the gonadotropin, but it is to be understood that the descriptions and detailed disclosures set forth are not to be regarded as limiting and that appropriate changes and variations may be made without departing from the spirit of the invention.

EXAMPLE 1—CULTURE (1) Harvesting of Starter Culture of Pituitary Tissue, Transportation and Processing There is employed as a source of the desired starting tissue a human pituitary gland, which may be either of embryonic origin or obtained by surgical removal from a patient. The removed gland is prepared for the subsequent culture stages by maintaining conditions which assure avoidance of death or injury to tissue due to routine surgical trauma, antiseptics, drying, contamination with fungi or bacteria, and similar phenomena which may occur in connection with excised tissues once they have been surgically removed from a donor.

The time of transportation of the tissue material from donor to initial culture stage is kept to a minimum, advantageously not more than about 4 to 6 hours, although a longer period may be used, and an optimum temperature of the tissues should be maintained, for example about 37° C. For purposes of transportation from surgery to the first tissue culture stage and to provide immediate bathing, the excised pituitary gland is placed immediately after removal from the donor into a stoppered glass vessel containing a nutrient medium including amino acids, vitamins, inorganic salts and antibiotics, aseptic methods being used throughout this step. The following Formula 1A is typical of a satisfactory composition for said transportation medium.

FORMULA 1A.—NUTRIENT MEDIUM FOR TRANSPORTATION OF EXCISED GLAND TISSUES l-amino acids:

| | | |
|---|---|---|
| Arginine | gms. per liter | 0.021 |
| Cystine | do | .012 |
| Histidine | do | .008 |
| Isoleucine | do | .026 |
| Leucine | do | .026 |
| Lysine | do | .026 |
| Methionine | do | .008 |
| Phenylalanine | do | .016 |
| Threonine | do | .024 |
| Tryptophan | do | .004 |
| Tyrosine | do | .018 |
| Valine | do | .024 |
| Glutamine | do | .300 |

Supplemental l-amino acids (added at 0.1 mM final concentration:

Aspartic acid
Glutamic acid
Alanine
Serine
Asparagine
Proline
Cysteine hydrochloride Added at 1.0 mM final concentration: Sodium pyruvate Vitamins:

| | | |
|---|---|---|
| Biotin | mg. per liter | 2.0 |
| Choline | do | 2.0 |
| Folic acid | do | 2.0 |
| Nicotinamide | do | 2.0 |
| Pantothenic acid | do | 2.0 |
| Pyridoxal | do | 2.0 |
| Thiamin | do | 2.0 |
| Riboflavin | do | 0.2 |
| i-Inositol | do | 3.6 |

Inorganic Chemicals:

| | |
|---|---|
| NaCl | gm. per liter  8.0 |
| KCl | do  0.40 |
| $CaCl_2$ | do  0.14 |
| $MgSO_4.7H_2O$ | do  0.10 |
| $MgCl_2.6H_2O$ | do  0.10 |
| $Na_2HPO_4.2H_2O$ | do  0.06 |
| $KH_2PO_4$ | do  0.06 |
| $NaHCO_3$ | do  0.35 |

Other Chemicals:

| | |
|---|---|
| Glucose | do  1.0 |
| Phenol red | do  0.02 |

Antibiotics: Concentration per ml.

| | |
|---|---|
| Penicillin | units  100 |
| Streptomycin | gammas  100 |

The gland is then transferred aseptically from the transport vessel to a sterile Petri dish moistened with the above-mentioned transport medium. Using very fine cutting instruments to avoid undesirable pressure on and trauma to the tissue, the gland is carefully sliced into thin sections which are then cross-cut into the smallest possible fragments. At this point, if it has not previously been done surgically, separation of the pituitary gland into the desired lobe portions may also take place. Thus, for example, the anterior lobe, consisting of epithelial glandular cells, varying in size and shape, and arranged in thick cord-like columns separated by thin walled blood sinuses, is isolated. The gland tissue fragments are transferred by means of a pipette into culture vessels previously prepared with a nutrient medium of the Formula 1B, having the following composition:

FORMULA 1B.—NUTRIENT FOR PROMOTING INITIAL OUTGROWTH OF EMBRYONIC OR ADULT GLAND TISSUE IN VITRO

Percent by volume
Serum (human, adult, pooled) ---------------------- 20
Basal medium ---------------------------------------- 80
Composition of basal medium: Same as Formula 1A.

Approximately 3 to 6 fragments are placed in Leighton culture tubes, or 6 to 12 fragments may be used in larger type flasks. The cultures are maintained in an incubator at 37° C. and at a pH of below about 7.6. The flasks may contain glass cover slips, perforated cellophane, cellulose sponge, plasma clots or rayon fibers. The initial culture technique provides the means by which, from among many fragments of tissue cut from the gland tissue, under the conditions described, viable cells in some of the tissue fragments will divide and migrate onto the glass, plasma clot, or other strata permitting them to be observed microscopically for evidence of cell multiplication and culture development. In some instances, cell multiplication may take place in a manner permitting viable tissue fragments to float on the culture medium, without any attachment to the glass culture vessel, and evidence of cell multiplication is generally provided by a decrease in pH of the culture fluid indicative of cell metabolism.

(2) *Stationary Tissue Culture Stage*

In this stage of the process of this invention, the initial growth material is cultured through one or more stationary culture stages, employing therefor the techniques of monolayer or bottle culture. The fluids from the initial culture stage with their suspended tissue fragments are transferred to other culture vessels, such as bottles or tubes, resulting in the development of cultures adapted to glass, and of confluent cell sheets upon the floor of the vessel. The nutrient medium is replaced by a medium of special composition containing extra amino acids not ordinarily regarded as essential for cell propagation. The temperature is maintained at about 37° C., and the pH at a value below about 7.6.

The culture medium preferably employed for stationary tissue culture has a composition corresponding to that of Formula 2:

FORMULA 2.—NUTRIENT FOR STATIONARY CULTURES

| | |
|---|---|
| Serum (human, horse or calf) percent by volume | 10 |
| Basal medium do | 90 |

Composition of basal medium:
  l-amino acids—

| | |
|---|---|
| Arginine gm. per liter | 0.021 |
| Cystine do | .012 |
| Histidine do | .008 |
| Isoleucine do | .026 |
| Leucine do | .026 |
| Lysine do | .026 |
| Methionine do | .026 |
| Phenylalanine do | .016 |
| Threonine do | .024 |
| Tryptophan do | .004 |
| Tyrosine do | .018 |
| Valine do | .024 |
| Glutamine do | .300 |

Supplemental l-amino acids (added at 0.1 mM final concentration)—

Aspartic acid
Glutamic acid
Alanine
Serine
Glycine
Asparagine
Proline
Cysteine hydrochloride Added at 1.0 mM final concentration—Sodium pyruvate Vitamins—

| | |
|---|---|
| Biotin mg. per liter | 2.0 |
| Choline do | 2.0 |
| Folic acid do | 2.0 |
| Nicotinamide do | 2.0 |
| Pantothenic acid do | 2.0 |
| Pyridoxal do | 2.0 |
| Thiamin do | 2.0 |
| Riboflavin do | 0.2 |
| i-Inositol do | 3.6 |

Inorganic chemicals—

| | |
|---|---|
| NaCl gm. per liter | 6.80 |
| KCl do | 0.40 |
| $CaCl_2$ do | 0.20 |
| $MgSo_4.7H_2O$ do | 0.20 |
| $NaH_2PO_4.H_2O$ do | 0.125 |
| $NaHCO_3$ do | 2.20 |

Other chemicals—

| | |
|---|---|
| Glucose do | 1.0 |
| Phenol red do | 0.02 |

Antibiotics— Concentration per ml.

| | |
|---|---|
| Penicillin units | 50 |
| Streptomycin gammas | 50 |

Cells may be successively removed for transfer and cultivated in as many culture stages or passages in the foregoing culture medium as desired. Cytological evaluations of the cell types being cultivated are made on the basis of samples removed from the cultures on glass cover slips or cellulose fragments which were permitted to be in contact with the culture for periods of 24 to 96 hours during which time the proliferating cells attach themselves to these sampling tools from which they can be readily removed, fixed, sectioned and stained for evaluation, in accordance with standard procedures.

It has been found that to promote the cultivation of specially desired cells, a culture transfer technique involving transfer of the cells on a substrate such as a cover slip, or upon selected portions of a cover slip, to which the cells adhere, provides particularly advantageous results. Our method of propagating and transferring cultures incorporates a system which does not require use of an enzyme or the mechanical scraping of cell sheets. We utilize fragments of coverslips within a culture and use these fragments as "seeding" or "starters" for new cultures. The continual addition of coverslip fragments and transferring fragments which have become populated with cells, to new daughter culture flasks, provides a non-traumatic transfer of a particular culture; in effect, provides for a continuation of the original culture by continually enlarging the available area for cell proliferation.

Thus, for example, a cover slip having various cell portions adherent thereto, may be removed from the medium, and the desired cell portion selected by breaking up the cover slip into pieces and selecting the portion to which the desired cells adhere for transfer to the next culture medium. This makes possible effective removal of cells and transfer without the danger of cell injury, and further avoids the disadvantages of the standard method of dissociating cells adhering to the surfaces or floor of culture vessels by the use of an enzyme (trypsin) or a chelating agent (Versene). The cells may also be removed by means of a rubber-tipped spatula and then dispersed into a suspension by gentle aspiration with a pipette. This suspension is then allowed to stand and sediment, or else it is gently sedimented while under refrigeration by centrifuging at a speed of 200 to 300 r.p.m. maximum for about 10 minutes. The supernatant is discarded and the sedimented cells resuspended in fresh nutrient (Formula 2), thereby providing a system of serial or successive dilutions designed to promote the growth of the desired gland or epithelial-like cells. The serial dilutions are designed to promote the growth of the desired cells in a range of cell population between about 1 cell to about 100 cells per sq. cm. of floor area of the culture vessel. In this way, serial propagation of the heterogeneous cell population in stationary culture, is accomplished.

On the basis of cytological investigation of the in vitro propagated cells, based upon microscopical examination, and comparison of the cultured cells with original gland cells and with the fixed and stained aliquot portions of the original parent tissues from which the cell cultures are derived, it was determined that among the various types of cells observed in the culture, including both fibroblastlike and epithelial or gland-like cells, the epithelial or gland-like cells contained structures identified with hormonal activity.

In accordance with the invention, it is found that an inoculum of cell suspension at a concentration of about 10,000 to 20,000 cells per ml. will provide a new stationary culture which will establish itself in about 24 hours and will develop a confluent cell sheet in from about 96 to 120 hours. Replenishment of the nutrient medium is guided by changes in pH and by microscopic evaluation of individual cells within the culture. Optimum growth is obtained with replenishment of the nutrient at intervals of 24, 72, and 96 hours. In this way the serial propagation of selected epithelial-like lines is carried out in stationary culture.

When a sufficient number of epithelial-like cells can be harvested from the stationary culture to provide an initial volume of at least 50 ml. of suspension at 200,000 to 300,000 cells per ml. it is an indication that adaptation to the next, or suspension, cell culture stage is to be undertaken. The adaptation process comprises feeding with the suspension culture medium of Formula 3, below, about 24 hours prior to the next regular scheduled stationary culture transfer and propagation during the next pasage in the suspension culture medium. This process of adaptation is continued for about 1 week prior to the beginning of the suspension culture stage. The number of cell passages in the stationary culture stage may range from about 7 to about 20.

(3) *Suspension Cell Culture Stage*

The purpose of this stage is the propagation of selected cell lines in suspension systems, and particularly the continuous propagation of such cell lines. The stationary cultures for transfer to the suspension or spinner system are drained of their nutrient, the cell sheet is gently scraped into a small volume of fresh suspension medium, and any clumps or cell sheet portions are gently broken up by aspiration. An aliquot portion of this suspension is mixed with a vital stain (Trypan Blue) and an enumeration is made of the viable cells in the suspension. The suspension volume is adjusted to provide the desired cell population of about 200,000 300,000 cells per ml. and the resulting suspension is transferred to the suspension culture system.

The culture medium employed for the suspension culture stage differs from the media previously employed and has the composition indicated in Formula 3:

FORMULA 3.—SUSPENSION CULTURE NUTRIENT MEDIUM

| | Percent |
|---|---|
| Serum (human, horse or calf) _____by volume__ | 10 |
| Spinner medium_____do____ | 90 |

Composition of spinner medium:
 l-amino acids—

| | gms. per liter |
|---|---|
| Arginine | 0.042 |
| Cystine | .024 |
| Histidine | .016 |
| Isoleucine | .052 |
| Leucine | .052 |
| Lysine | .052 |
| Methionine | .016 |
| Phenylalanine | .032 |
| Threonine | .048 |
| Tryptophan | .008 |
| Tyrosine | .036 |
| Valine | .048 |
| Glutamine | .300 |

Supplemental l-amino acids (added at 0.1 mM final concentration)—
  Aspartic acid
  Glutamic acid
  Alanine
  Serine
  Glycine
  Asparagine
  Proline
  Cysteine hydrochloride
 Added at 0.1 mM final concentration— Sodium pyruvate
 Vitamins—

| | mg. per liter |
|---|---|
| Biotin | 2.0 |
| Choline | 2.0 |
| Folic acid | 2.0 |
| Nicotinamide | 2.0 |
| Pantothenic acid | 2.0 |
| Pyridoxal | 2.0 |
| Thiamin | 2.0 |
| Riboflavin | 0.2 |
| i-Inositol | 3.6 |

Inorganic chemicals—

| | gm. per liter |
|---|---|
| NaCl | 6.8 |
| HCl | 0.4 |
| $NaH_2PO_4 \cdot H_2O$ | 1.44 |
| $MgCl_2 \cdot 6H_2O$ | 0.177 |
| $NaHCO_3$ | 2.2 |
| Other chemicals—Glucose | 1.0 |

Antibiotics—
  Penicillin__concentration per ml__ 100 units
  Streptomycin _____do____ 100 gammas The suspension systems employed may be any of those described in the literature for this type of cell culture. The volume of culture used may range from about 25 ml. to about 100,000 ml. or more with uniformly productive results. Population densities of suspension cultures may range from about 50,000 to as much as about 5 or more million cells per ml.

Evaluation of cell types being propagated in the suspension cultures may be made by using sterile cellulose sponge fragments placed in the culture for 24 to 96 hours, removed, fixed, sectioned and stained. The cells in the suspension adhere to these fragments and proliferate on their surfaces.

Although transformation of pituitary cells into altered form, in accordance with this invention, may take place even during the very early stationary culture stage, it will generally first appear during the 5th to 7th passage or transfer. After the 7th or 8th or subsequent passages, the cells move on to a more mature stage in which they exhibit more stabilized chromatin activity and develop granular or vacuolar structures similar to the original pituitary cells. At that time it is observed that an unexpected and unpredictable transformation has taken place, wherein the surviving cells have been altered into new chromosomal types, not found in nature, exhibiting polyploid growth characteristics chromosomal content.

The altered cells are also more fragile than the original cells and have to be handled with greater care. They have sensitive cell membranes which may burst during transfer, centrifuging, suction, and other treatment. They comprise a selected, highly homogeneous altered cell line.

(4) Cell Harvesting and Preservation

The altered cells or cell lines of this invention may be preserved by freezing techniques, and restored to growth and hormone production after resumption of culturing. Thus, it is possible at various intervals to have the cells preserved as viable in a dormant state and later re-activated for a new growth cycle, which may take place either in a stationary or a suspension medium. In accordance with the preferred cell preservation method of this invention, the cells are concentrated to a population density of about 200,000 to 300,000 cells per ml. in a growth medium corresponding to that of either Formulas 2 or 3 previously described, glycerol is added to the medium to a final concentration of about 5%, and using a serum concentration of about 20%. The material may, for example, be placed in glass ampules which are heat sealed and stored in a refrigeration apparatus at a temperature between about $-80°$ and $-70°$ C. under conditions which assure maintenance of this environment. It has been found, unexpectedly, that hormone production by the altered cells will survive this low temperature treatment. Thus, for example, a cell line derived from stationary cell growth was stored in a freezer repository, restored to stationary culture, then transferred to spinner or suspension culture. Two harvests of the spinner or cell suspension culture were found to contain amounts of gonadotropin averaging about the same as that of untreated cells.

*Characteristics of the altered pituitary cells.*—As mentioned previously, there are obtained in accordance with the process of this invention altered living human pituitary cells, not found in nature, and which possess the characteristics of new compositions of matter. They retain their human or primate strain, but at the same time exhibit greatly increased chromosome counts, ranging from about 76 to 81 chromosomes, predominantly about 79 chromosomes, and represnt a transformation from the diploid chromosome number of 46 chromosomes which is characteristic of ordinary human cells. At the same time the hormone secretory ability of the altered cells as compared with the original human pituitary cells is maintained or even enhanced.

The novel nature of the cells of this invention is demonstrated by tests made with a gonadotropin-producing cell line obtained from human fetal pituitary. In this cell line, identified as S4374–M–32, the first individual cell colony (clone) derived from growth from the edge of a fragment of the pituitary, the cells appeared as polyhedral cells about $10-12\mu$ in length, with oval, highly chromatic nuceli containing 2 to 4 large nuceoli, and the cytoplasm, in addition to fine granules containing small to large masses of clear, nonstaining or faintly blue staining vacuolar material, when stained with aniline blue fuchsin. In spinner or suspension culture, these cells developed into much larger cells, globular and measuring 15 to 25 or 30 microns or more in diameter, containing large nuclei, usually with 2 to 4 large and prominent nucleoli; the cytoplasm, in addition to fine pink staining granules, contained numerous masses of clear nonstaining vacuolar material which is characteristic of these cells when stained with aniline blue fuchsin, a conventional pituitary differentiating stain. The vacuolar material is more refractory to light than the surrounding cytoplasm or the nucleus. These cells thus appeared as typical chromophobes and the cultures with the higher titer of hormone production appeared to possess larger masses of vacuolar material.

The new cells exhibit a rapid multiplication rate, and further mitotic figures, which are not found in ordinary human pituitary cells.

*Chromosome count.*—An aliquot of human pituitary cell line S–4374–M–32 mentioned above was placed in spinner culture at $37°$ C. After 3 hours a cell count was made which showed a value of 160,000 cells per ml. 2 ml. of $10^{-4}$ M colchicine were added and incubation in the spinner culture was continued overnight until the cell count was found to be 200,000 ml. The cells were then centrifuged lightly at 500 r.p.m. for 5 minutes, and the supernatant fluid discarded. To the sediment there was added with stirring 20 ml. of 1% sodium citrate in distilled water. The suspension was allowed to remain at room temperature for 10 minutes, after which it was centrifuged again and the supernatant fluid discarded. The cells in the sediment were fixed by the addition of 10 ml. of 50% acetic acid, without stirring, and the material was subjected to the chromosome count.

The chromosome count indicated that the cell line is unmistakenly primate (human). Most chromosomes were metacentric, submetacentric, and subtelocentric, with a few elements discernible as acrocentric or telocentric. Out of 25 cells randomly selected, chromosome counts showed a rather narrow spectrum with a modality at 79 as shown in Table 1 below. The cell strain was definitely transformed into heteroploid, and the presence of the telocentric or acrocentric chromosomes indicated that chromosome rearrangement had also taken place in the development of the strain.

TABLE 1

| Chromosome number | Number of cells |
| --- | --- |
| 76 | 2 |
| 77 | 1 |
| 78 | 3 |
| 79 | 11 |
| 80 | 5 |
| 81 | 3 |
| Total | 25 |

The cell strain is accordingly characterized as a human type, heteroploid pituitary chromophobe.

The altered cells of this invention are also adaptable to growth in media containing sera of species other than human, such as for example, calf serum or horse serum (cf. Formulas 2 and 3, above). Hormone production occurs in cells thus adapted.

It was not known, prior to this invention, that human pituitary cells could be grown in stationary or spinner or suspension cultures or that they would produce hormones following such growth, whether in human or nonhuman sera media. The above chromosome count indicates that the altered cells, however, retain their basic human characteristics even after growth in horse serum.

*Demonstration of hormones.*—The altered cells of this invention also possess hormone generating or secreting activity and thus provide a means for the production of pure and individual hormones outside the body. Thus, growth hormone, gonadotropin, thyrotropin, and corticotropin assays may be made on preparations made from the cultures at the heterogeneous-, selected-, and suspension-cell stages. The demonstration for growth hormones is made in accordance with the extraction and assay procedures described by Raben and Westermeyer, Proc. Soc. Exp. Biol. and Med., vol. 78, page 550 (1951); vol. 80, page 83 (1952); and in Science, vol. 125, page 883 (1957), and for gonadotropin or adrenocorticotropin by conventional procedures.

In accordance with an adaptation of this procedure a growth hormone assay may be made by first precipitating this cell suspension with acetone, drying the precipitate after washing with acetone. Preferably the pH of the cell suspension is first adjusted prior to addition of acetone to pH 5.0, with acetic acid or hydrochloric acid, after which the acetone precipitation is carried out. A crude powder is thus obtained which may be tested in animals for hormone activity or may be first purified. The dry acetone powder, e.g. 300 mg., is treated successively while stirring with 1 ml. acetone and 6 ml. 99.5% acetic acid. The resulting mixture is gradually heated to 70° C. within about 25 minutes, while stirring vigorously with a magnetic stirrer. After cooling the suspension to approximately 30° C., it is centrifuged at about 12,000 r.p.m. and the clear, colorless supernatant liquid carefully decanted. 1 ml. of 99.5% acetic acid is mixed with the residue and the suspension again centrifuged. Both supernatants are joined. To the residue, 1 ml. of acetone is added, and the suspension is centrifuged. The liquid is added to the above supernatants. A total of 8 ml. is thus obtained. To this there is added 0.04 ml. of a 5 M potassium acetate solution and 4 ml. acetone. The solution is refrigerated several hours. Peroxide-free ether (12 ml.) is added to the solution which is refrigerated overnight. The flocculent precipitate is centrifuged and washed with acetone until all traces of acetic acid are removed. 35 mg. of a nearly white powder are obtained. This powder is dissolved in 3 ml. of 0.1 N acetic acid and the turbid solution centrifuged. The clear supernatant is further treated with 3 mg. powdered oxidized cellulose, suspended in about 0.5 ml. of 0.1 N acetic acid and stirred at room temperature for 18 hours. The supernatant is treated with potassium acetate and 95% alcohol to a 60% alcohol concentration to yield a flocculent precipitate which yielded 6.5 mg. of a powder exhibiting growth hormone activity. The growth hormone (somatotropin) is tested by measuring the change in width of the tibial epiphysis in female rats, hypophysectomized at 30 days of age.

The altered cell lines are capable of producing growth hormones and particularly gonadotropin. The gonadotropin produced by the altered cells contains follicle stimulating hormone (F.S.H.) and luteinizing hormone (L.H.), but not luteotropin. The gonadotropin is assayed in two ways:

(*a*) A preliminary screening test is used to determine the presence of the hormone. The intact immature female mouse is used as test animal and the effect of the preparation on the weight and appearance of ovaries and uterus is observed. The increase in weight of the uterus is the most sensitive criterion. For this test, standard quantities of dried or liquid preparation are employed, usually 5 to 10 mg. of dried preparation or 0.5 to 1.0 ml. of liquid preparation. This dose is divided into 8 doses given during 4 days and the animals are killed on the 100th hour, at which time the ovaries and uteri are weighed. Uteri weighing more than 15 mg. are deemed to indicate gonadotropic stimulation.

(*b*) A definitive test to determine quantity and type of gondatropin is performed on 26-day old hypophysectomized male rats, which are injected with the first injection within 24 hours after hypophysectomy. The rats receive 6 injections during 3 days and are killed at 100 hours. The follicle stimulating hormone (F.S.H.) causes an increase in weight of the testis and the luteinizing hormone (L.H.) or the interstitial cell stimulating hormone (I.C.S.H.) causes an increase in weight of the ventral prostate organ. The rat units of F.S.H. are defined as used in the present invention to be that amount which causes an increase of 50% in the weight of testes, over and above the control weights. The rat unit of L.H. as used for purposes of this invention is defined as that amount which causes an increase of 100% in the weight of the ventral prostate, over and above the control weight. Thyrotropin may be tested in 1-day-old chicks, by the U.S.P. (XV) method. Corticotropin is tested by the ascorbic acid depletion method in hypophysectomized rats.

The cells and cell lines of this invention were tested for the presence of gonadotropin, employing the screening tests above described in mice. Where the presence of gonadotropin was indicated, the amount and type was determined in hypophysectomized male rats, as described in Example 2.

EXAMPLE 2.—ASSAY

An assay sample of a cell line was prepared by adding 5 volumes of cold acetone to freshly harvested whole spinner culture of a pituitary cell line containing 299,000 living cells per ml. The precipitate formed was washed with acetone, dried in vacuo, to yield 10.5 mg. of powder per ml. of culture fluid. The powder was ground in a mortar and taken up in distilled water at the time of injection into the rats. The acetone dried powder was found to contain 1 rat unit of F.S.H. in 20 mg. and 1 rat unit of L.H. in 10 mg.

*Recovery of hormones.*—The hormones are recovered preferably from the suspension culture stage by adding to the suspension culture an organic liquid capable of precipitating the hormone in crude form. While any suitable liquid may be employed for this purpose, acetone is preferred. The crude hormone powder may be purified by further treatment with acetone and acetic acid, as described in connection with the assay method.

EXAMPLE 3.—HORMONE RECOVERY

To a suspension culture of human pituitary cell line as obtained in Example 1, there were added 5 volumes of cold acetone. The resulting precipitate was washed with acetone, and dried in vacuo. It was found to exhibit hormone activity.

The altered living human pituitary cells of this invention are new compositions of matter analogous to new organic compounds. Besides having an abnormal or different number of chromosomes, as indicated previously, the altered cells show variations in the individual chromosomes, which are different from those of normal cells. They include telocentric chromosomes in which one arm pair is much longer than the other, acrocentric chromosomes, in which there are only two arms, the point of union being at one end, as in the letter V or U.

The altered cells or cell lines are adapted to growth in either human, horse, or calf serum, without impairment of their hormone producing capabilities. The can be frozen and regrown after prolonged storage without impairment of their hormone secretory ability.

*Hormone production in various culture stages.*—Small amounts of growth hormone, gonadotropin, and corticotropin were definitely detected in the heterogeneous cultures produced by the pituitary cells. In the selected epithelial cell culture stage, somewhat larger quantities of gonadotropin are found. This is considered an indication that when freed from the encumbrance of other cell types, or when present in larger numbers, these cells may produce larger amounts of hormone.

In the suspension or spinner culture stage the production of gonadotropin was larger and more definite. The gonadotropic action represented the combined effect of F.S.H. and L.H., as shown by tests in the hypophysectomized immature male rat. In the gonadotropin thus produced by the cells of the suspension culture no luteotropin (prolactin) was detected.

Thus, the gonadotropin produced by the altered pituitary cells of this invention above described is a mixture of follicle stimulating hormone and of luteinizing hormone, and no luteotropin, growth hormone, or corticotropin is detectable in its cultures. The altered cells have been frozen, recultivated, and re-introduced into both stationary and suspension types of culture with resumption of their production of hormone.

What is claimed is:

1. Process for the production of pituitary hormones normally secreted by gland cells within the human body and having human species specificity which comprises separating human pituitary gland tissues from the human body, culturing said tissues in stationary culture to form undifferentiated cell cultures, serially propagating said undifferentiated cells in stationary culture, selecting epithelial-like cells from said culture, serially propagating said epithelial-like cells in stationary culture, selecting epithelial-like cell lines which exhibit hormone secretion and propagating said cell lines in suspension culture to secrete pituitary hormones, and precipitating the pituitary hormones from said suspension culture.

2. The method of claim 1 in which the hormone is human gonadotropic complex hormone.

3. Process for the production of altered human secretory pituitary cells having a nucleus containing from about 76 to about 81 chromosomes including a small number of telocentric and acrocentric chromosomes, said cells being heteroploid and possessing pituitary hormone producing activity which comprises the steps of maintaining freshly excised human pituitary tissue at about 37° C. in a basal nutrient medium comprising amino acids, vitamins, inorganic salts and antibiotics, cutting said tissues into small fragments while in contact with said medium, culturing said fragments for initial growth in a nutrient medium comprising said basal medium and containing about 20% human serum by volume together with cell nutrients until viable tissue fragments are obtained, repeatedly culturing said viable tissue fragments in stationary culture media in glass vessels at about 37° C. and at a pH below about 7.6 in a nutrient medium containing about 10% by volume of animal serum and containing amino acids, vitamins, inorganic salts, and antibiotics, transferring selected epithelial-like cells adhering to the glass surfaces of said vessels by gentle mechanical movement of said cells and introduction thereof into successive portions of culture medium, said stationary culture being continued until a cell population density of about 1 to 100 cells per sq. cm. of vessel floor area is attained, transferring said cells at a concentration of about 200,000 to 300,000 cells per ml. to a suspension culture system, repeatedly culturing said cells in said suspension system at a cell population density of about 50,000 to about 5 million or more cells per ml. in a nutrient medium containing a higher concentration of amino acids than the stationary culture medium until altered cells appear which exhibit increased chromosome count, heteroploid characteristics, and hormone producing activity, and separating said altered cells.

4. The process of claim 3 in which the cells are grown on a coverslip frament and transferred by removing said coverslip populated with selected cells from the culture medium, and placing said coverslip fragment carrying selected cells into fresh culture medium.

5. Process for the production of human pituitary hormones which comprises the steps of maintaining freshly excised human pituitary tissue at about 37° C., in a basal nutrient medium comprising amino acids, vitamins, inorganic salts and antibiotics, cutting said tissue into small fragments while in contact with said medium, culturing said fragments for initial growth in a nutrient medium comprising said basal medium and containing about 20% human serum by volume together with cell nutrients until viable tissue fragments are obtained, repeatedly culturing said viable tissue fragments in stationary culture media in glass vessels at about 37° C. and at a pH below about 7.6 in a nutrient medium containing about 10% by volume of animal serum and containing amino acids, vitamins, inorganic salts, and antibiotics, transferring selected epithelial-like cells adhering to the glass surfaces of said vessels by gentle mechanical movement of said cells and introduction thereof into successive portions of culture medium, said stationary culture being continued until a cell population density of about 1 to 100 cells per sq. cm. of vessel floor area is attained, transferring selected epithelial-like cells at a concentration of about 200,000 to 300,000 cells per ml. to a suspension culture system, repeatedly culturing said epithelial-like cells in said suspension system at a cell population density of about 50,000 to about 5 or more million cells per ml. in a nutrient medium containing a higher concentration of amino acids than the stationary culture medium until a sufficient concentration of hormone is secreted in said suspension medium, and then precipitating said hormone from said suspension medium.

References Cited in the file of this patent

UNITED STATES PATENTS 2,658,021     Earle                  Nov. 3, 1953

OTHER REFERENCES

Best and Taylor: Physiological Basis of Medical Practice, Sixth Ed., p. 783.

Gould: Medical Times Great Neck, 84(3), pp. 302–305, March 1956, through C.L.M.L., vol. 30, entry 4728, July-September 1956.

Westward et al.: British Journal of Experimental Pathology, vol. 38, No. 6, pp. 587–6001, December 1957.